Dec. 2, 1952      R. L. MACKLIN      2,620,263
FRACTIONAL SEPARATION OF CRYSTALLINE SOLIDS
Filed Feb. 25, 1947
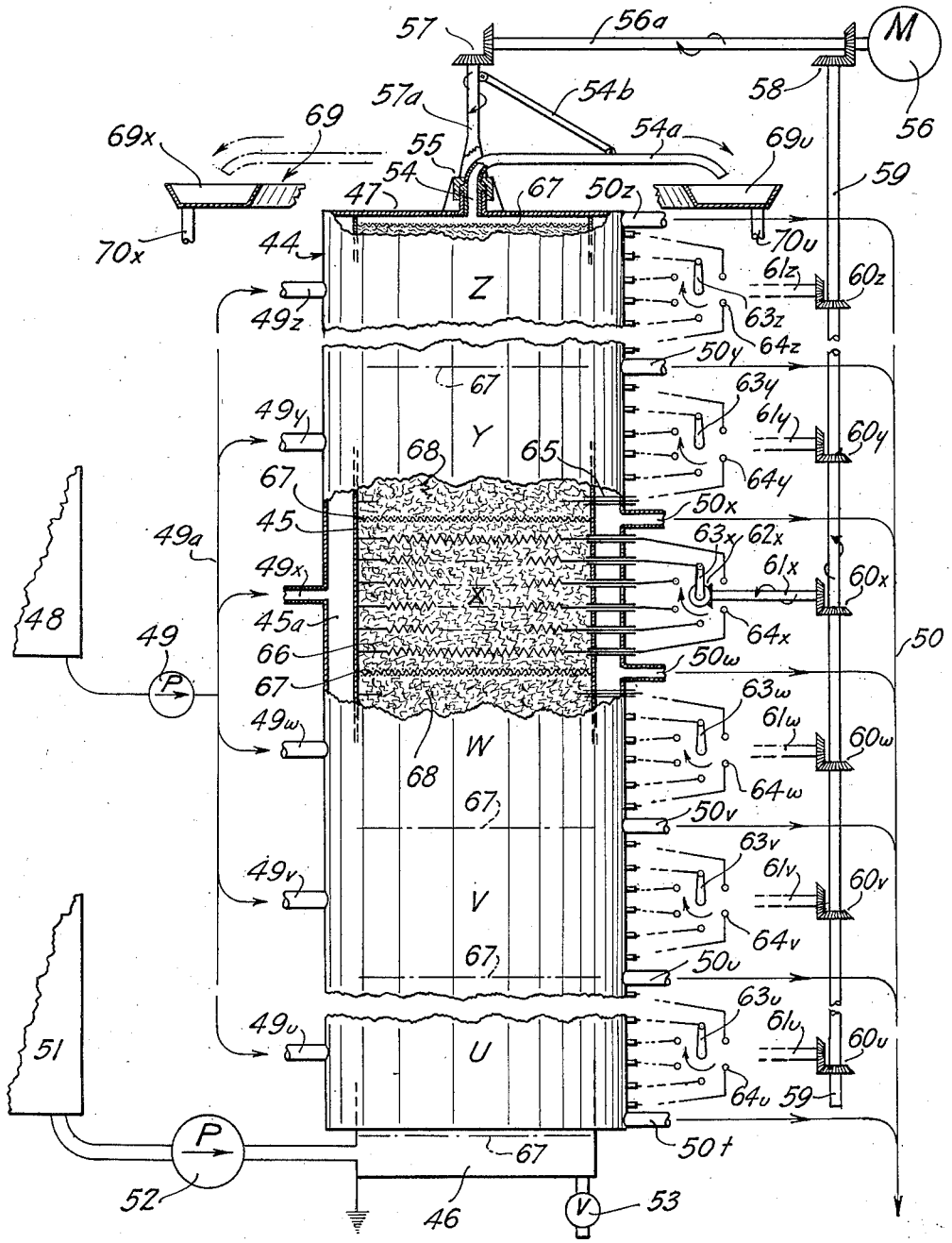
INVENTOR,
Richard L. Macklin.
BY
James H. Clark
His Patent Attorney.

Patented Dec. 2, 1952

2,620,263

UNITED STATES PATENT OFFICE 2,620,263

FRACTIONAL SEPARATION OF CRYSTALLINE SOLIDS

Richard Lawrence Macklin, Oak Ridge, Tenn., assignor of one-half to James M. Clark, Jamaica, N. Y.

Application February 25, 1947, Serial No. 730,871

6 Claims. (Cl. 23—296)

The present invention relates to crystallization and more particularly to methods and means for the separation of solids by fractional recrystallization.

It has been known for some time that mixtures of liquids could be partially separated by volatilizing and separately condensing a portion of the mixture. Means has further been known and devised for automatically repeating such cycles of volatilization and separation, and recombining the separated portions to produce as nearly complete separation of the various component liquids as desired. This has been generally known in the chemical art as fractional distillation. Methods have also been known and practiced in the prior art whereby crystalline solids are partially, and in many cases almost completely, separated by dissolving a portion of the mixture in a suitable liquid and recrystallizing this portion separately.

In the prior art referred to the process of fractional crystallization has heretofore been practiced for purifying crystals from a solution of several component crystalline materials by cooling the mother liquor very quickly to separate only one or the other components. These prior processes are improved upon by the present invention which relates to methods and means which utilize a continuous cyclic dissolution and fractional recrystallization process for a solution containing several component crystals whereby there is obtained a purer yield of crystals for each component of the solution. The process is repeated until substantially pure crystals of individual crystalline compounds have been segregated. Applicant's improved apparatus comprises a reaction vessel which may be of tubular, circular, or other form, divided into cells or sections for holding the various component crystalline solids as they deposit out of the solution upon a suitable matrix such as glass wool or the like; or in the form of a column or still the individual components may be separated into solutions of the desired components.

The present invention is directed to improvements in the methods and means for automatically repeating cycles of dissolution and recrystallization, and continuously combining the appropriate fractions so as to produce as nearly a complete separation of the component crystals as desired. This is accomplished by the present invention by the circulation of a solution of the mixed solids within a column or other vessel in which the temperature gradient is moved relative to the column, or vice versa, and the recrystallized solids are formed and retained by an inert matrix or packing material within the column or vessel. Such relative motion may be accomplished either by moving the temperature gradient relative to the vessel in which arrangement the operation may preferably be a continuous one within a columnar type vessel or the vessel may be moved with respect to a fixed temperature gradient preferably obtained by the rotation or other movement of a circuitous or continuous vessel more particularly suited for batch operation. In installations where the column is fixed and the solution of mixed solids is circulated, it is advantageous in certain cases to provide a series of several successive temperature gradients following each other along the column. This is in contradistinction with prior devices which met with considerable difficulty in applying the so-called "counter-current" principles to fixed columns and gradients, incomplete heat cycles, and the difficulty of causing solid crystals to flow downward as the condensed vapors do for example in the fractional distillation of liquids.

It is accordingly a primary objective of the present invention to provide improved methods for the fractional separation of crystalline solids from solutions. A further and corollary object resides in the provision of improved means for such separation of solids both for batch and continuous operation. A further object lies in the improved application of temperature gradients, both fixed and moving, to vessels containing solutions of the crystals to be separated. Another object involves a novel method and apparatus for the batch operation of a rotary type solution-containing vessel. Further objects lie in the improved construction and parts as well as the novel relationship of the elements and flow cycle in such a batch type crystalline separator.

It is a still further and important object of the present invention to provide a novel method and apparatus for the continuous separation of crystals from a jacketed column type solution-containing vessel. A further object resides in the improved construction and parts as well as the novel relationship of the elements and flow cycle in such a continuous type crystalline separator. Other objects and advantages of the present invention will occur to those skilled in the art after a reading of this description taken together with the accompanying drawing, forming a part hereof, in which:

The figure is a diagrammatic side elevational view of apparatus utilizing the present invention and adapted for continuous operation.

Referring now to Fig. 1, there is diagrammatically shown a preferred embodiment of a fixed column in which a plurality of temperature gradients are moved progressively up the column. This apparatus preferably comprises a jacketed vertical shell 44 within which is disposed the solution-containing vessel or column 45. The latter is preferably cylindrical, having a sump or bottom portion 46 and a top plate 47. A source of coolant fluid is indicated at 48 which is supplied by the pump 49 at a relatively high velocity through the header 49a having branches 49u, 49v, 49w, 49x, 49y and 49z. The coolant is caused to flow circumferentially within the jacket space 45a around the column wall 45 and flows out into the header 50 through the branch outlets 50t, 50u, 50v, 50w, 50x, 50y and 50z on the side of the jacket shell 44 opposite the inlet branches 49u, 49v, etc.

A heated solution of the mixed solids to be separated is maintained at the proper temperature in the tank 51 from which it is drawn by the pump 52 and pumped into the bottom 46 from whence it flows upwardly within the column 45. A drain connection and valve 53 is provided at the bottom 46 to facilitate emptying and cleaning the column. An outlet 54 is provided through the top plate 47 connecting with a rotating delivery head 54a through the swivel joint 55. A motor 56 having a drive shaft 56a drives a bevel gear set 57 meshingly engaged at the adjacent terminals of the shaft 56a and the shaft 57a from which the delivery head 54a is supported by the bracket 54b. Adjacent the motor 56 another set of bevel gears 58 is arranged to drive the vertical shaft 59 from the motor drive shaft 56a.

Disposed at suitable vertical spacing along the shaft 59 are bevel gear sets 60u, 60v, 60w, 60x, 60y and 60z serving to drive the horizontal timing shafts 61u, 61v, 61w, 61x, 61y and 61z respectively. The latter shafts drive bevel gear sets 62u, 62v, 62w, 62x, 62y and 62z of which only 62x is shown for purposes of clarity, and these bevel gears cause the arms 63u, 63v, 63w, 63x, 63y and 63z to rotate at the same speed in engagement with the electrical contacts 64u, 64v, 64w, 64x, 64y and 64z respectively. These contacts are connected by electrical leads passing through the fluid-tight bushings 65 to the horizontal circular immersion type electrical heaters 66 disposed across the path of the vertically moving solution. A plurality of these heaters are superimposed above each other in an equally spaced relationship and are connected by the leads to the contacts 64u, 64v, etc. such that the lowest heater in each cell or set, such as U, V, W, X, Y and Z, is energized and heated first. As the arms 63u, 63v, etc., connected to the power source, rotate clockwise they successively energize and heat the next heater above the previous one in each set or cell. This accordingly provides a series of successive temperature gradients, following each other upwardly along the column. The shaft 59 and all the mechanism which it drives may accordingly be said to comprise a timing mechanism, all the elements of which rotate at the same speed as the delivery head shaft 57a. A plurality of circular screens 67 serve to define the limits of each cell U, V, W, etc. and serve to prevent migration of the glass wool 68 along the column while permitting the solvent or solution to pass therethrough.

An annular collector ring or trough 69 is positioned beneath the circular path followed by the discharge end of the delivery head 54a. The trough is, however, partitioned off into a plurality of separate sections 69u, 69v, 69w, 69x, etc. for receiving the materials separated according to their degree of solubility. Each segment of the collector ring is provided with its own drain pipe 70u, 70v, 70w, etc. through each of which the separated materials are drawn off to their respective tanks or containers.

The operation of the continuous type apparatus shown in Fig. 1 is as follows: The hot solution containing the mixture is pumped from the tank 51 up through the bottom of the column, from 67 into cell U, thence to cell V, W, etc. As the pump 49 distributes coolant from the tank 48 around the jacketed cell sections the solids in the mixture crystallize on the glass wool 68. With the motor started and the heater current supply turned on, the periodic application of the electric current to the lowest immersion heater redissolves the solids deposited there, allowing them to be carried upward in solution until the cooling effect of the jacket causes them to crystallize again. Similar periodic redissolutions and recrystallizations take place as the other heaters in the lowest set, in cell U, are successively energized. The band of materials then passes to the second set, cell V, of heaters where these steps are repeated, then to the third set in cell W, and so on to the last or uppermost set in cell Z. From the uppermost set of heaters the solids (in solution) pass to the rotating delivery head. The most soluble component, having moved up the column most rapidly, arrives first and flows into the collector for the most soluble material. The delivery head, in being geared to the timer for the heaters, makes a complete revolution for each revolution of the contactor arms 63u, etc. or correspondingly for each band of materials, cell or zone such as U, V, W, etc., and similarly for each set of heaters. In other words, as indicated above, the arms 63u, etc. rotate at the same speed as the delivery head 54a. The various components of the original input mixture are accordingly drawn off in separate collectors placed at differing angular positions of the delivery head as determined by their solubilities.

It will accordingly be noted that a form of apparatus has been shown and described for carrying out the disclosed cyclic dissolution and fractional recrystallization process. Other forms and modifications of both the herein disclosed apparatus and process which will become obvious to those skilled in the art are intended to come within the scope and spirit of this invention as set forth in the appended claims.

I claim:

1. Apparatus for the continuously separation of solids from a mixture including a tubular column adapted to contain said mixture, a coolant jacket around said column, spaced screens dividing said column axially into a plurality of cells, a plurality of axially spaced heating means disposed within said column and control means operatively connected to said heating means for progressively and continuously heating successive axially spaced portions of said mixture within said column for effecting redissolution and recrystallization of said solids for their progressive separation from said mixture.

2. Apparatus for the continuous separation of solids from a mixture including a tubular column adapted to contain said mixture, inert material within said tubular column, spaced partitioning means permeable to solution axially dividing said inert material within said column into a plurality of cells, a plurality of axially spaced heater means disposed within each of said cells, pump means for applying a coolant to said cells, and continuously heating means for progressively heating successive axially spaced portions of said mixture within each of said cells and fluid displacement means for causing said mixture to move axially through said column for effecting its redissolution and recrystallization of said solids for their continuous and progressive separation and discharge from said column in proportion to said progressive application of heat to said axially spaced portions.

3. A process for the continuous separation of a homogeneous mixture of solids which comprises heating said solids for conversion into a fluid mixture, continuously passing said fluid mixture upwardly through a vertical column containing a bed of space-filling inert material, continuously subjecting the bed to a plurality of vertically spaced temperature gradients throughout the height of said bed, causing these temperature gradients to continuously move upwardly in the direction of flow toward the outlet end of the bed while continuously maintaining said vertical spacing of said temperature gradients, continuously maintaining a predetermined timed relationship between the upward movement of said temperature gradients and the discharge from the outlet end of the bed and continuously recovering successive component fractions of the introduced mixture of solids as they are discharged at said upper outlet end of said bed.

4. Apparatus for the continuous separation of solids from a mixture including a vessel adapted to contain said mixture, inert material within said vessel, controlled heating means for applying a plurality of spaced progressively moving temperature gradients to the contents of said vessel, circulating means for moving said contents with respect to said moving temperature gradients, said heating means including a plurality of series of fixed heating elements spaced apart in the direction of circulating flow of the contents of said vessel and means for progressively energizing the corresponding heating elements of each of said series for the continuous progressive movement of the said temperature gradients throughout the length of said vessel.

5. Apparatus for continuously separating mixtures of solids comprising a vertical column packed with an inert material, said column having a series of sections, a surrounding jacket containing a liquid coolant, means for continuously circulating said liquid coolant throughout the vertical height of said jacket, a series of groups of vertically spaced fixed heating elements arranged within said inert material with a group of heating elements in each said section, each of said groups comprising a plurality of fixed heating elements each of which corresponds to an element in each of the other groups in the series, means for causing the mixture to flow through the inert material within said column past said heating elements and power-actuated sequence means for causing corresponding heating elements of each said series to be progressively energized to provide in cooperation with said liquid coolant jacket a series of continuously moving temperature gradients throughout the vertical height of said column.

6. An apparatus for separating mixtures of solids comprising a vertical column filled with inert material, said column having a series of vertically spaced sections and an upper outlet, a surrounding concentric jacket containing a liquid coolant, means for circulating the coolant within said jacket, a plurality of vertically spaced fixed heating elements disposed within said inert material, pump means for introducing and passing a heated fluid mixture of said solids upwardly through said column toward the upper outlet of said column, power-driven timing means for successively energizing said spaced fixed heating elements in such manner that a plurality of vertically spaced temperature gradients are successively moved upwardly in the direction of flow of said fluid mixture and discharge means driven in timed relationship with said timing means associated with said column upper outlet for recovering successive components cyclically dissolved and fractionally recrystallized from the introduced mixture of solids.

RICHARD L. MACKLIN.

REFERENCES CITED

The following references are of record in the file of this patent:

UNITED STATES PATENTS

| Number | Name | Date |
|---|---|---|
| 1,646,454 | Isaachsen | Oct. 25, 1927 |
| 2,196,594 | Muskat | Apr. 9, 1940 |
| 2,427,042 | Bowman | Sept. 9, 1947 |

FOREIGN PATENTS

| Number | Country | Date |
|---|---|---|
| 21,783 | Sweden | Feb. 18, 1905 |
| 57,430 | Sweden | Feb. 7, 1923 |